Patented Sept. 24, 1940

2,215,955

UNITED STATES PATENT OFFICE 2,215,955

METAL SALTS OF 12-KETOSTEARIC ACID

Henry L. Cox, South Charleston, W. Va., assignor, by mesne assignments, to Union Carbide and Carbon Corporation, a corporation of New York No Drawing. Original application June 7, 1934, Serial No. 729,442. Divided and this application April 7, 1939, Serial No. 266,707

3 Claims. (Cl. 260—413)

The invention relates to new chemical compounds, in particular metal salts of 12-ketostearic acid.

The scope of the invention, and the new chemical compounds included therein, may be represented by the following structural formula:

$$[CH_3-(CH_2)_5-CO-(CH_2)_{10}-COO]_nR$$

in which R is a metallic element indicative of salts of this acid, and $n$ is one or more depending upon the valency of R. These salts are solid waxy materials at atmospheric temperatures, and the compounds exhibit properties especially desirable as stabilizers and plasticizers in lacquer and plastic compositions formulated from natural and synthetic gums and resins.

The 12-ketostearic acid may be prepared by oxidizing 12-hydroxy-stearic acid, $$CH_3(CH_2)_5CH(OH)(CH_2)_{10}COOH$$

which in turn can be synthesized from castor oil. Castor oil consists chiefly of the glyceride of ricinoleic acid, or triricinolein, which when hydrogenated, saponified with sodium hydroxide, and then hydrolyzed with acid, will yield the above hydroxystearic acid. By further treatment of this acid with chromic acid, or other oxidizing agent, a carbonyl group is formed at the 12 position of the molecule, and the resulting product is 12-ketostearic acid. The carboxyl hydrogen of the acid can be replaced with a metal by reacting the acid with sodium hydroxide to produce sodium 12-ketostearate, and treating the latter with a salt of the metal desired.

As illustrative of the manner of preparing the 12-ketostearic acid, and certain of its salts, the following examples are given:

Example 1

Castor oil was treated in the manner previously indicated, and a quantity of 12-hydroxystearic acid was obtained and identified by its known properties. One hundred and fifty grams of this hydroxystearic acid was dissolved in 250 grams of acetic acid. With constant stirring a mixture of 30 grams of chromic acid (CrO₃) in 500 grams of acetic acid was gradually added at a temperature of 30° to 35° C. After the reaction was complete, the whole was poured into several volumes of water, and a crude product crystallized out. This was dissolved in methanol, again precipitated with water, and then dried. A final yield of 120 grams was obtained, which had an acetyl number of substantially zero, and an equivalent weight and other properties indicating the product 12-ketostearic acid, which may be represented by the structural formula $$CH_3-(CH_2)_5-CO-(CH_2)_{10}-COOH$$

Example 2

One hundred grams of 12-ketostearic acid was dissolved in methanol and an excess of caustic soda added. The mixture was then neutralized, and copper acetate solution added in an amount required to form a salt of the acid. At completion of the reaction, the mixture was poured into several volumes of cold water, and the product separating out was washed several times with hot water, and finally dried. A yield of 98 grams was obtained, and the material identified as copper 12-ketostearate. This product was a green waxy solid, melting at 120° C., and having the probable structural formula $$[CH_3-(CH_2)_5-CO-(CH_2)_{10}-COO]_2Cu$$

Example 3

In substantially the same manner as Example 2, a sodium soap of 12-ketostearic acid was made, and to this calcium acetate was added. The product precipitating out on dilution with water, was washed, dried, and identified as calcium 12-ketostearate. This was a white waxy solid melting at 138° to 140° C., and having the probable structural formula $$[CH_3-(CH_2)_5-CO-(CH_2)_{10}-COO]_2Ca$$

The invention should not be limited other than as defined in the appended claims. This application is a division of my copending application Serial No. 729,442, filed June 7, 1934.

I claim:
1. A metal salt of 12-ketostearic acid.
2. Calcium 12-ketostearate.
3. Copper 12-ketostearate.

HENRY L. COX.